United States Patent [19]

Brand et al.

[11] Patent Number: 4,705,690
[45] Date of Patent: * Nov. 10, 1987

[54] WEIGHTING OIL SUBSTITUTES

[75] Inventors: Larry M. Brand, West Chester; Harry C. McDaniel, Cincinnati, both of Ohio

[73] Assignee: The Procter & Gamble Co., Cincinnati, Ohio

[*] Notice: The portion of the term of this patent subsequent to Nov. 10, 2004 has been disclaimed.

[21] Appl. No.: 799,084
[22] Filed: Nov. 18, 1985
[51] Int. Cl.$^4$ .............................................. A23L 2/00
[52] U.S. Cl. .................................... 426/590; 426/611
[58] Field of Search .............. 426/590, 333, 569, 599, 426/601, 602, 611, 616, 650, 651, 654, 250, 804, 330.3, 330.5, 330.6; 260/408; 536/119

[56] References Cited

U.S. PATENT DOCUMENTS

| 3,028,403 | 4/1962 | Fritz et al. | |
| 3,240,794 | 3/1966 | Bornfleth | |
| 3,600,186 | 8/1971 | Mattson et al. | |
| 3,637,774 | 1/1972 | Babayan | 260/408 |
| 3,724,999 | 4/1973 | Stein | 260/408 |
| 3,954,976 | 5/1976 | Mattson et al. | |
| 3,963,699 | 6/1976 | Rizzi et al. | 536/119 |
| 4,005,195 | 1/1977 | Jandecek | 426/658 |
| 4,034,083 | 7/1977 | Mattson | |
| 4,093,750 | 6/1978 | Babayan | 426/548 |
| 4,334,061 | 6/1982 | Bossier III | |
| 4,368,213 | 1/1983 | Hollenbach et al. | 426/590 |
| 4,517,360 | 5/1985 | Volpenhein | |
| 4,518,772 | 5/1985 | Volpenhein | |

OTHER PUBLICATIONS

Melillo Food Product Development, Jun. 1977, pp. 108-110.
Woodroof et al, 1981, Beverage Carbonated and Noncarbonated AVI Publishing Company, Westport, Conn., pp. 170-178.
Oppenheimer, Food Product Development, May 1971, pp. 90, 92, 94.
Jones, B. A. et al, "Bromine Levels in Tissue Lipids of Rats Fed Brominated Fatty Acids", Lipids, vol. 18, No. 4, pp. 319-326, (1983).
Jones, B. A. et al, "Toxicology of Brominated Fatty Acids: Metabolite Concentration & Heart & Liver Changes", Lipids, vol. 18, No. 4, pp. 327-334, (1983).
Gaunt, I. F. et al, "Brominated Maze Oil I. Short Term Toxicity and Bromine-Storage Studies in Rats Fed Brominated Maze Oil", Food and Cosmetic Toxicology, vol. 9, No. 1, pp. 1-11, (1971).
Gaunt, I. F. et al, "Brominated Maize Oil II. Storage of Lipid-Bound Bromine in Pigs Fed Brominated Maize Oil", Food and Cosmetic Toxicology, vol. 9, No. 1, pp. 13-19, (1971).
Munro, I. C. et al, "Biochemical and Pathological Changes in Rats Fed Brominated Cottonseed Oil for 80 Days", Food and Cosmetic Toxicology, vol. 7, pp. 25-33, (1969).
Munro, I. C. et al, "Biochemical and Pathological Changes in Rats Fed Low Dietary Levels of Brominated Cottonseed Oil", Food and Cosmetic Toxicology, vol. 9, pp. 631-637, (1971).
Osipow, L. et al, "Methods of Preparation Fatty Acid Esters of Sucrose", Industrial and Engineering Chemistry, vol. 48, No. 9, pp. 1459-1462, (1956).
Woodroof, J. G. and Phillips, G. F., "Beverages; Carbonated and Noncarbonated", Revised Edition, AVI Pub. Co., Inc., Westport, Conn., pp. 154-157, (1981).
Frenkel, M. et al, "Brominated Surfactants as Emulsifiers and Weighting Agents. Part I: Preparation and Surface Properties", Colloids and Surfaces, vol. 5, pp. 353-362, (1982).
Shankaracharya, N. B. et al, "Clouding Agents for Soft Drinks", Indian Food Packer, Mar.-Apr., (1980), pp. 39-47.

Primary Examiner—Raymond N. Jones
Assistant Examiner—Carolyn Paden
Attorney, Agent, or Firm—Eric W. Guttag; Ronald L. Hemingway; Richard C. Witte

[57] ABSTRACT

The present invention relates to edible, but non-absorbable and non-digestible, halogenated liquid polyesters as weighting oils in carbonated and non-carbonated beverages. It has now been found that bromination of polyol fatty acid ester compounds does not affect their absorption properties, solubility, viscosity, or flavor. Thus the brominated polyol fatty acid ester compounds can be used as weighting oils in beverages with substantially no absorption of bromine by the consumer.

13 Claims, 3 Drawing Figures

WEIGHTING OIL SUBSTITUTES

TECHNICAL FIELD

The present invention relates to certain edible, but non-absorbable and non-digestible, halogenated liquid polyesters which can be used as weighting oils in carbonated and non-carbonated beverages.

BACKGROUND OF THE INVENTION

Carbonated and non-carbonated soft drinks are frequently flavored using essential oils and essential oil extracts of a lipophilic nature. These materials are insoluble or poorly soluble in water, and generally have specific gravities less than that of water. These properties make it difficult to incorporate essential oils and essential oil extracts into beverages. In order to prepare a beverage using one or more flavoring oils, it is necessary that these oils be in the form of aqueous emulsions. Typically, a water-soluble material such as gum acacia, a modified starch, or carboxymethylcellulose, is employed to form an emulsion with the flavoring oils. The emulsification of the flavoring oil and water-soluble material can be accomplished by means of an homogenizer, colloid mill, turbine-type agitator, or any other apparatus which are well known in the art. During the emulsification the water-insoluble flavoring is broken up into very small particles with diameters of about 0.1 to about 3.0 microns. The gum coats the particularized oil to aid in preventing coalescence and maintaining an appropriate dispersion.

With time, the flavor emulsion, even if finely dispersed, can separate from the beverage and form an oil ring or slick at the top of the container. The conventional solution to this problem is to mix the flavor emulsion with a weighting oil, usually a brominated vegetable oil, to adjust the specific gravity of the emulsion. The brominated vegetable oil is a vegetable oil which has been halogenated and has a high specific gravity. The weighting oil is mixed with the flavor emulsion in appropriate small proportions to provide a mixture having a specific gravity greater than that of the flavor emulsion, and approximately equal to that of the beverage. The weighting oil thereby prevents migration of emulsion particles to the surface of the beverage. The specific gravities of the beverage and the mixture of weighting oil and flavor emulsion are not required to be equal to be functional. The exact specific gravity or balancing point is determined by the soft drink formula. The resulting mixture of flavor emulsion and weighting oil, when finely dispersed, is sufficiently stable to avoid separation from the beverage by migration to the beverage surface or sedimentation over the foreseeable lifetime of the product.

Substitutes for brominated vegetable oils as weighting oils have been sought for several years. U.S. Pat. No. 4,093,750, issued June 6, 1978 to Babayan, discloses the use of a polyglycerol ester of a fatty acid as a replacement for brominated vegetable oil.

U.S. Pat. No. 3,600,186, issued Aug. 17, 1971 to Mattson and Volpenhein, describes non-absorbable low calorie food compositions produced by replacing at least a portion of the fat content of a conventional food with a sugar fatty acid ester or sugar alcohol fatty acid ester having at least four fatty acid ester groups, with each fatty acid having from 8 to 22 carbon atoms. That patent discloses the discovery that certain fatty acid ester compounds having at least 4 fatty acid ester groups have the physical properties of ordinary triglyceride fats but are not digested or absorbed to the same extent when eaten. Data in the patent indicate that these materials are sparingly absorbed from the gastrointestinal tract, particularly when they comprise 10% or less of the total dietary fats consumed. U.S. Pat. No. 3,963,699, issued June 15, 1976 to Rizzi and Taylor, describes a solvent-free transesterification synthesis of higher polyol fatty acid polyesters. U.S. Pat. No. 4,334,061, issued June 8, 1982 to Bossier III, discloses an improved recovery process for polyol fatty acid polyesters. U.S. Pat. No. 4,005,196, issued Jan. 25, 1977 to Jandacek and Mattson, observes that polyol fatty acid polyesters and triglycerides are miscible. When both are present, a single oil phase is formed.

It has now been found that bromination of these fatty acid ester compounds does not affect their absorption properties, solubility, viscosity, or flavor. Thus the brominated fatty acid ester compounds can be used as weighting oils in beverages or in flavors with substantially no absorption of bromine by the consumer.

It is therefore an object of the present invention to provide brominated polyol fatty acid polyester compounds that are safe for use in foods for human consumption.

It is a further object of the present invention to provide brominated polyol fatty acid polyester compounds that are safe for use in beverage weighting oils.

It is a further object of the present invention to provide effective soft drink weighting oils comprising flavor oils or emulsions and substantially non-absorbable brominated polyol fatty acid polyester oils.

It is a further object of the present invention to provide flavors, beverage concentrates, carbonated beverages, and noncarbonated beverages containing substantially non-absorbable brominated polyol fatty acid polyester oils.

These and other objects of the invention will be obvious from the following descriptions and examples.

DISCLOSURE OF THE INVENTION

Figure 2:
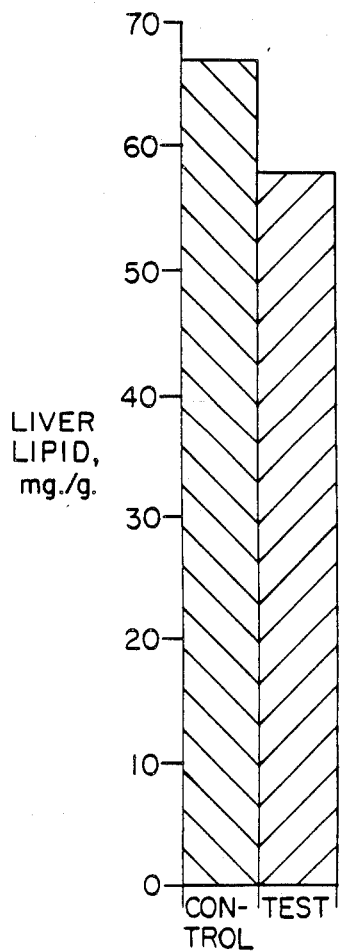
FIG. 2 depicts the average lipid content of the livers of rats fed a control diet, and a test diet containing a brominated polyol fatty acid polyester oil.

This invention is based on the discovery that certain polyol fatty acid polyesters, prepared using unsaturated fatty acids can be brominated using conventional halogenation techniques to produce materials having physical properties which make them suitable for use as beverage weighting oils. Surprisingly, it has been discovered that the brominated polyol fatty acid polyester materials possess non-absorbability, non-digestibility and beverage weighting oil functionality. The bromination of these polyol fatty acid polyesters does not affect their absorption properties, solubility, viscosity or flavor.

The brominated liquid polyol polyesters employed in this invention comprise edible non-absorbable, non-toxic, non-digestible, liquid brominated polyol fatty acid polyesters, having at least four fatty acid ester groups, wherein the polyol is selected from the group consisting of sugars and alcohols containing at least 4 hydroxyl groups, and wherein each fatty acid group has from about 8 to about 22 carbon atoms. This invention further comprises beverage weighting oils comprising said brominated polyol fatty acid polyesters, and combinations of this weighting oil with a flavor oil or emulsion. In addition, this invention comprises beverage concentrates, and carbonated or noncarbonated beverages containing these brominated polyol fatty acid polyesters as a weighting oil.

DESCRIPTION OF PREFERRED EMBODIMENTS

This invention relates to beverage weighting oils comprising certain brominated polyol fatty acid polyester compounds and beverages containing said weighting oils. The compounds of the present invention are sugar or sugar alcohol fatty acid esters. The term "sugar" is used herein in its conventional sense as generic to mono- and disaccharides. The term "sugar alcohol" is also used in its conventional sense as generic to the reduction product of sugars wherein the aldehyde or ketone group has been reduced to an alcohol. The brominated fatty acid polyesters are prepared by brominating fatty acid polyesters made by reacting a monosaccharide, disaccharide, or sugar alcohol with a fatty acid having from about 8 to about 22 carbon atoms.

The polyol starting material must have at least four esterifiable hydroxyl groups. Suitable polyols may be selected from the following classes: saturated and unsaturated straight and branched chain linear aliphatics; saturated and unsaturated cyclic aliphatics, including heterocyclic aliphatics; or mononuclear or polynuclear aromatics, including heterocyclic aromatics. Carbohydrates and non-toxic glycols are preferred polyols. Preferred polyols are sugars, including monosaccharides and disaccharides, and sugar alcohols. Examples of monosaccharides containing four hydroxyl groups are xylose and arabinose and the sugar alcohol derived from xylose, which has five hydroxyl groups, i.e., xylitol. As a further illustration, the monosaccharide erythrose is not suitable in the practice of this invention since it only contains three hydroxyl groups, but the sugar alcohol derived from erythrose, i.e., erythritol, contains four hydroxyl groups and accordingly can be used. Suitable five hydroxyl group containing monosaccharides are galactose, fructose, and sorbose. Sugar alcohols containing six hydroxyl groups derived from the hydrolysis products of sucrose, as well as glucose and sorbose, e.g., sorbitol, are also suitable. Examples of oligosaccharides which can be used include maltose, kojibiose, nigerose, cellobiose, melibiose, gentiobiose, turanose, rutinose, trehalose, lactose, sucrose, and raffinose. Polysaccharides suitable for use herein include, for example, amylose, glycogen, cellulose, chitin, inulin, agarose, zylans, mannan and galactans.

Preferred polyols for preparing the polyesters for use in the present invention are selected from the group consisting of erythritol, xylitol, sorbitol, glucose and sucrose. Sucrose, which is cheaply available in relatively high purity, is especially preferred.

The polyol starting material having at least four hydroxyl groups must be esterified on at least four of the hydroxyl groups with a fatty acid containing from about 8 to about 22 carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic, and erucic, acids. These fatty acids can be derived from naturally occurring or synthetic fatty acids, including positional and geometric isomers. Naturally occurring fats and oils can serve as the source for the fatty acid, such as rapeseed oil, tallow, soybean oil, cottonseed oil, coconut oil, palm kernel oil, babassu oil, corn oil, lard, olive oil, palm oil, peanut oil, safflower seed oil, sesame seed oil, and sunflower seed oil. However, since sights of unsaturation on the fatty acids are necessary to provide for bromination of the molecule, and since liquid polyol polyesters are preferred, at least about half of the fatty acid incorporated into the polyester molecule must be unsaturated. Preferred are fatty acids having from about 14 to about 18 carbon atoms. Oleic and linoleic acids, and mixtures thereof, are especially preferred.

The liquid polyol fatty acid polyesters useful in the brominated polyol fatty acid polyesters of this invention must contain at least four fatty acid ester groups. Brominated polyol fatty acid polyester compounds that contain three or less fatty acid ester groups are digested in the intestinal tract much the same as conventional polyol fatty acid polyester compounds containing three or less fatty acid ester groups, and much the same as ordinary triglyceride fats, and are thus absorbed from the intestinal tract as well. Brominated polyol fatty acid polyester compounds that contain four or more fatty acid ester groups are substantially non-digestible and consequently non-absorbable by the human body. It is not necessary that all of the hydroxyl groups of the polyol be esterified with fatty acid, but it is preferable that the polyester contain no more than two unesterified hydroxyl groups. Most preferably, substantially all of the hydroxyl groups of the polyol are esterified with fatty acid, i.e., the compound is substantially completely esterified. The fatty acids esterified to the polyol molecule can be the same or mixed, but, as noted above, a substantial amount of the unsaturated acid ester groups must be present to provide liquidity and permit bromination.

The following are non-limiting examples of specific liquid polyol fatty acid polyesters containing at least four fatty acid ester groups suitable for use in the present invention: glucose tetraoleate, the glucose tetraesters of soybean oil fatty acids (unsaturated), the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and sucrose tetraoleate, pentaoleate, hexaoleate, heptaoleate, and octaoleate, and mixtures thereof. As noted above, highly preferred brominated polyol fatty acid polyesters are those wherein the fatty acid groups contain from about 14 to about 18 carbon atoms and are derived from natural materials such as soybean oil, olive oil, and the like. Examples of such compounds include sucrose octaoleate and the sucrose hexa-, hepta-, and octa-esters of soybean oil fatty acids, partially hydrogenated, and mixtures thereof.

The polyol fatty acid polyesters suitable for use in the present invention can be prepared by a variety of methods well known to those skilled in the art. These methods include: transesterification of the polyol with methyl, ethyl or glycerol fatty acid esters, using a variety of catalysts; acylation of the polyol with a fatty acid chloride; acylation of the polyol with a fatty acid anhydride; and acylation of the polyol with a fatty acid, per se. The Rizzi and Taylor method of U.S. Pat. No. 3,963,699, mentioned above, and as further described in their article in *Journal of the American Oil Chemists Society*, 55:398 (1978), is particularly useful, and the disclosures of that patent are incorporated herein in their entirety by reference.

In addition, the subsequent work of R. A. Volpenhein, disclosed in U.S. Pat. No. 4,517,360 and 4,518,772, issued May 14, 1985 and May 21, 1985, respectively, has shown that the Rizzi and Taylor synthesis can be further improved. In particular, Volpenhein has found that by modifying the solvent-free transesterification reaction of Rizzi and Taylor by using potassium carbonate, sodium carbonate, or barium carbonate as the catalyst, and/or using significantly higher soap:sucrose mole ratios than those originally envisioned, shorter reaction times, more complete utilization of the polyol component, and improved yields of the higher polyol polyesters can be obtained. Potassium carbonate is especially preferred as the catalyst. Preferred soap:polyol ratios are from about 0.6:1 to about 1:1.

The fatty acid polyesters can then be brominated by any of several methods known to those skilled in the art. For example, elemental bromine in a suitable solvent such as carbon tetrachloride, ethyl acetate, petroleum ether, and the like, are commonly employed for reaction with olefins to form 1,2-dibromides. The reaction of bromine with an olefin is believed to proceed by electrophilic attack of the halogen on the double bond to form an intermediate ion. The intermediate ion formed from bromine and an olefin can react with any nucleophile in the reaction medium. The presence of an excess amount of halide ion during the halogenation of an olefin in a nucleophilic solvent will increase the fraction of dihalide in the product. When an N bromo amide, such as N-bromosuccinimide or N-bromoacetamide, is used as the source of the bromine, the concentration of the bromide ion is kept low minimizing dibromide formation. Use of cosolvents such as dimethyl sulfoxide or dimethylformamide are useful for the preparation of bromohydrins. The preparation of bromohydrin derivatives is believed to involve an electrophillic attack on the olefin by the protonated bromoamide to form a bromonium ion. The bromonium ion is believed to react with the nucleophile to form the isomer in which bromine is bonded to the less highly substituted carbon atom. Solvents such as dimethylformamide, dimethyl sulfoxide, acetonitrile, and acetone, can also be employed as nucleophiles. The preferred method for preparation of the brominated polyol fatty acid polyesters is by reaction of elemental bromine with the polyester. The specific gravity of the brominated polyester is a function of the amount of bromine incorporated into the molecule.

The nonmetabolism of the brominated fatty acid polyesters of the present invention has been demonstrated from a fat balance study detailed in Examples 2 and 3. This was a conventional experiment in which rats were fed a dietary fat containing either a control oil or a brominated polyol fatty acid polyester, and bromine uptake by the liver measured and compared.

The livers of the animals receiving a dietary exposure of a brominated polyol fatty acid polyester did not differ significantly from those receiving the control, a non-brominated vegetable oil, with respect to bromine content, size, lipid content, or microscopic appearance.

This invention further comprises combinations of flavors and brominated polyol fatty acid polyesters or combinations of flavors and weighting oils containing the brominated polyol fatty acid polyesters as a component. The flavor component can comprise one or more suitable flavor oils, extracts, oleoresins and the like, known in the art. This component can also comprise flavor concentrates such as those derived from concentration of natural products such as fruits. Examples of suitable flavors include fruit flavors such as orange, lemon, lime, and the like, cola flavors, tea flavors, coffee flavors, meat flavors, vegetable flavors, chocolate flavors, and others. The flavors can be derived from natural sources such as essential oils and extracts, or can be synthetically prepared. The flavor component typically comprises a blend of various flavors and can be employed in the form of an emulsion.

A flavor emulsion is typically prepared by mixing the flavor with an emulsifying agent and water. A water-soluble material such as gum acacia, a modified starch, carboxymethylcellulose, gum ghatti, or other suitable gums can be used as the emulsifying agent. Other suitable ingredients such as color, acid, or a preservative can be incorporated into the emulsion if desired.

The flavor or flavor emulsion is then mixed with the brominated polyol fatty acid polyester. If desired, the flavor and brominated polyol fatty acid polyester can be mixed prior to emulsification. An emulsifying agent and other suitable ingredients can also be added prior to emulsification. Such flavor emulsions containing brominated polyol fatty acid polyester are suitable for use in a wide variety of foods and beverages.

For use in beverages, oil particle size is reduced by milling or homogenizing, employing suitable apparatus known in the art, because the ability of emulsifying agents to hold oil in suspension is proportional to particle size. Emulsions of particles with diameters of about 0.1 to about 3.0 microns are suitable for use in this invention. Preferably, the particles are about 2.0 microns or less in diameter. If the particles size is not substantially uniform, the emulsion will tend to have a limited shelf-life and separation of the oil in the finished product may occur. The emulsifying agent coats the particularized oil to aid in preventing coalescence and in maintaining an appropriate dispersion. Viscosity and specific gravity are regulated to be compatible with the finished beverage.

In beverages the weighting oil has a higher specific gravity and thus prevents migration of the emulsion particles to the surface of the beverage. The specific gravities of the weighting oil and flavor or flavor emulsion are not required to be equal for the weighting oil to be useful. The amounts of flavor or flavor emulsion and weighting oil vary depending upon the beverage formula and the proper proportions can be calculated by those skilled in the art. The suspended oil particles diffuse light and cause a cloudy effect, so use of flavor emulsions is preferred when an unclear beverage is desired. A neutral oil is typically added to the emulsion as a clouding agent to create a sufficient level of cloudiness.

This invention further comprises carbonated and noncarbonated beverages, beverage concentrates, and beverage syrups, containing brominated polyol fatty acid polyesters as a component. Included are fruit juices; beverages containing fruit juice such as ades, punches, or the like; ready-to-drink flavored sweetened or diet beverages such as cola, soda, orange, lemon-lime, and other similar flavored soft drinks; frozen soft drinks such as slushes, sno-balls and the like; chocolate drinks not containing milk; vegetable beverages; meat, poultry, or fish broth beverages; coffee and teas; and electrolyte drinks. Beverage concentrates or syrups include the above-listed beverages prior to dilution to drinking strength such as fountain syrups or juice concentrates used in beverage manufacture. It has been found that inclusion of the brominated polyol fatty acid polyester does not adversely affect the flavor, appearance, viscosity, or stability of the beverage, syrup, or concentrate.

It can be appreciated that other executions of this invention can be devised without departing from its scope and spirit and without losing its advantages. Minor beverage flavor or emulsifier ingredients can be altered without departing from the scope of the invention. In particular, use of brominated polyol fatty acid polyesters in flavors and beverages, however practiced, results in products which are safe for human consumption.

The following examples illustrate the invention described herein, but are not intended to define the limits thereof. All percentages are by weight unless otherwise stated.

EXAMPLE 1

Example 1 demonstrates the preparation of a brominated polyol fatty acid polyester of the present invention.

A sucrose polyester is prepared from safflower oil according to U.S. Pat. No. 3,600,186 of Mattson et al., issued Aug. 17, 1971. The polyester has a specific gravity of 0.95 and an iodine value of 19. This polyester was then brominated as follows:

Two hundred sixty g. of the polyester was added to 200 ml. water and 60 ml. petroleum ether contained in a 2 liter flask. The mixture was vigorously stirred with a motor-driven Teflon paddle and 80 ml. of liquid bromine was added dropwise over 4 hours with ice bath cooling. The ice bath was then removed and the mixture was stirred for a further 18 hours. The solvent was then removed using a rotary evaporator. The residue was dissolved in 3 liters of ethyl ether and dried by the addition of anhydrous magnesium sulfate. After removal of the magnesium sulfate by filtration and the ether by rotary evaporation, the remaining traces of solvent were removed by steam stripping. The residue was gently heated on a steam bath while being flushed with dry nitrogen gas. Following this procedure, the product was dried and deodorized by rotary evaporation under high vacuum. The yield was 285 g. of a dark red-brown brominated sucrose polyester with a specific gravity of 1.31, and bromine content of 41.0%.

EXAMPLE 2

Example 2 demonstrates a fat balance study indicating the brominated polyol fatty acid polyesters of the present invention are not absorbable.

Brominated polyol fatty acid sucrose polyesters were prepared as in Example 1 derived from soybean oil.

Groups of 6-9 male CD-1 rats, weighing approximately 200 g., were given single oral doses of the brominated sucrose polyester. For reference, similar groups of rats received identical doses of either soybean oil, known to be readily digestible, or the unbrominated non-abosrbable sucrose polyester.

The exact amounts of each oil that was ingested by the animals were calculated. The excreta of the animals were quantitatively collected at 24 hour intervals, and the extractable lipid content of the faeces was determined as a measure of absorbability. In the case of the brominated oil, the feces content of extractable bromine was used as a specific monitor of brominated oil recovery. Other lipids were quantitated gravimetrically. After 48 hours following dosing, no further excretion of administered lipid was found to occur. The level of oil recovery is summarized in Table 1.

TABLE I

| Oil Administered | Recovery of Oil in Feces % of Dose |
| --- | --- |
| Brominated sucrose polyester | 88 |
| Soybean oil | 12 |
| Sucrose polyester | 92 |

From the experiment, it is seen that the extent of absorption of the brominated sucrose polyester is low. Observed recovery of administered oil in this range (85%-105%) is generally considered to constitute evidence of functional non-absorption, within the limits of the experimental method. By contrast, it is seen that relatively little of the edible soybean oil was recovered in the feces of the animals dosed with these materials. The soybean oil is known to be digestible. It is thus concluded that the brominated sucrose polyester is a non-absorbable form of brominated oil.

EXAMPLE 3

Example 3 demonstrates that the brominated polyol fatty acid polyesters of the present invention are not digested or metabolized.

The brominated polyol fatty acid polyester of Example 1 was employed. Groups of 4 male CD-1, rats, each weighing approximately 100 g. initially, were fed test diets for 4 days containing ground rat chow supplemented with either 1) 10% corn oil (control), or 2) 8% corn oil plus 2% brominated sucrose polyester prepared from safflower oil (BrSPE or test). The diet is shown in Table II.

TABLE II

| Casein | 22% |
| --- | --- |
| Cerelose ® | 63% |
| Fat | 10% |
| Salt | 4% |
| Standard vitamin mix | 1% |
| A minor amount of anise oil to insure palatability | |

Weight gain and food intake were measured daily, and at the end of the 4 day period all animals were killed and their livers weighed and evaluated for pathologic changes and bromine content. The total fat content of each liver was determined by extracting a portion using chloroform:methanol (2:1), quantitated, and assayed for organic bromine content using the neutron activation method of Jones, B. A., Tinsley, I. J., and Lowry, R. R., "Bromine Levels in Tissue Lipids of Rats Fed Brominated Fatty Acids", *Lipids,* Vol. 18, No. 4, pp. 319-326 (1983). Histologic changes were determined by evaluation of hematoxylineosin stained sections using Oil Red O staining where appropriate to identify fatty infiltration of the tissue. The method employed was that of Thompson, S.W. and Hunt, R.D., "Microscopic Histochemical Methods for the Demonstration of Lipids", in

*Selected Histochemical and Histopathological Methods,* (Chas. Thomas, Springfield, Ill.), 1966. The above methods are herein incorporated by reference.

Figure 1:
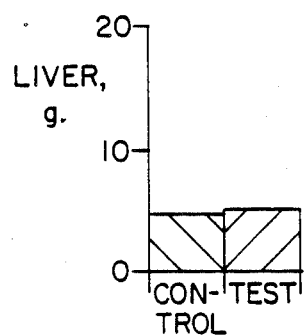
FIG. 1 depicts the average size of the livers of rats fed a control diet, and a test diet containing a brominated polyol fatty acid polyester oil.
Figure 3:
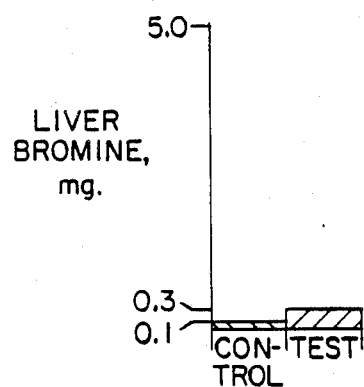
FIG. 3 depicts the average bromine content of the livers of rats fed a control diet, and a test diet containing a brominated polyol fatty acid polyester oil.

The results are summarized in Table III and FIGS. 1 through 3.

TABLE III

| Group | Relative Liver Size (% body wt.) | Liver Pathology (fatty infiltration) | Liver Lipid Content (mg/g) |
|---|---|---|---|
| Control | 4.9 ± 0.1 | 0/4 (none) | 67 ± 7 |
| 2% BrSPE | 5.1 ± 0.3 | 0/4 (none) | 58 ± 3 |

| Group | Liver Lipid Br Content (ppm) | Total Liver Br Content (mg) | Brominated Oil Intake (g) |
|---|---|---|---|
| Control | 1 ± 0 | 0.1 ± 0.0 | none |
| 2% BrSPE | 2 ± 1 | 0.3 ± 0.1 | 1.51 ± 0.09 |

(Values are means ± standard errors)

The livers of the animals receiving a dietary exposure of brominated sucrose polyester did not differ significantly from normal (control) livers with respect to bromine content, size, lipid content or microscopic appearance.

Animals were grossly examined at necropsy and sections of liver and heart taken for microscopic examination. Microscopic alterations in the heart were absent in the animals fed the control or brominated polyester diets. Gross alterations of the liver, such as enlarged appearance and subtle lobular accentuation did not occur in animals fed the control or brominated polyester diet. Liver enlargement was checked for by organ and body weight analysis. Absolute and relative liver weights for animals fed the brominated polyester and control diets were not significantly elevated. Microscopically, liver alterations were characterized as minimal, fine, lipid-like hepatocellular vacuolization and minimally accentuated intrahepatic spaces. These alternations were subtle and at times difficult to quantitate due to the presence of background changes. However, attempted quantitation of these changes led to the conclusion that they were not present in animals fed the brominated polyester diet more so than in those fed the control.

The absence of effect in animals fed brominated polyester was consistent with the results expected, based on non-absorbability of brominated polyol fatty acid polyesters.

EXAMPLE 4

Example 4 demonstrates a beverage containing brominated polyol fatty acid polyesters as a weighting oil. A brominated sucrose polyester was prepared as in Example 1.

An orange beverage was prepared according to the following formula.

| Ingredients | Percent by Weight |
|---|---|
| Water | 82.90 |
| Sugar | 16.64 |
| Acid | 0.31 |
| Color | 0.01 |
| Orange oil | 0.02 |
| Sodium benzoate | 0 06 |
| Gum acacia | 0.05 |
| Brominated sucrose polyester | 0.01 |

An orange flavor concentrate was prepared by combining water, color, gum acacia, acid, sodium benzoate and orange oil. Two portions of this mixture were combined individually with the brominated sucrose polyester and brominated vegetable oil as a control. The specific gravity of the brominated sucrose polyester was about 1.44, and that of the brominated vegetable oil was 1.33, so the amounts used were compensated for the difference in gravity. The mixtures were emulsified by means of an homogenizer. The particle size distribution of the emulsions appeared normal when checked by microscope and by Microtrac, an instrument available from Leeds Northrup of St. Petersburg, Fla. A portion of each emulsion was then combined with sugar, water, acid, and sodium benzoate to form a beverage syrup. A control beverage syrup was prepared from the beverage emulsion containing brominated vegetable oil, and the test syrup from the emulsion containing brominated surcose polyester. The syrup was diluted 1:4 volume/volume with distilled water to make a single strength beverage which was carbonated with about 2 volumes of carbon dioxide. The beverages appeared normal in all respects.

The remaining flavor emulsion was stored at 34° F. (1° C.) for about 10 months. Upon checking with microscope and Microtrac at 5 and 10 month intervals, the emulsion appeared normal.

After 10 months of storage, single-strength beverages were prepared as above and tasted in a duo trio test by eight expert panelists. In this test each panelist was given samples of 3 beverages. One was designated as the standard. The panelist was told one sample tasted like the standard and the other sample did not. The panelist was asked to choose which sample tasted like the standard. No significant difference was found between the beverage containing brominated sucrose polyester and that containing brominated vegetable oil.

These beverages were then stored upright for eight weeks. No oil rings appeared on the surface of the test or control beverages. All beverages maintained the desired cloudy opaque appearance. Thus the brominated sucrose polyester is useful as a weighting oil in that the flavor does not separate from the oil, beverage appearance is maintained over time, and beverage taste is indistinguishable from a control beverage. However, the brominated polyol fatty acid polyester is non-absorbable, so that there is substantially no adsorption of bromine by the consumer. Bromination of the polyol fatty acid polyester does not adversely affect its absorption properties, solubility, viscosity, or flavor.

What is claimed is:

1. A beverage weighting oil consisting essentially of an edible, non-absorbable, non-toxic, non-digestible liquid brominated polyol fatty acid polyester having at least 4 fatty acid ester groups, wherein the polyol is selected from the group consisting of sugars and alcohols containing at least 4 hydroxyl groups, and wherein each fatty acid group has from about 8 to about 22 carbon atoms.

2. The weighting oil of claim 1 wherein the polyol fatty acid polyester contains no more than 2 free hydroxyl groups.

3. The weighting oil of claim 1 wherein the fatty acid ester groups contain from about 14 to about 18 carbon atoms.

4. The weighting oil of claim 1 wherein the polyol is a member selected from the group consisting of erythritol, xylitol, sorbitol, glucose, and sucrose.

5. The weighting oil of claim 4 wherein the polyol is sucrose and the sucrose fatty acid polyester is a member selected from the group consisting of $C_{14}$, $C_{16}$, and $C_{18}$ hexa-, hepta-, and octa-esters, and mixtures thereof.

6. The weighting oil of claim 1 wherein the fatty acid is unsaturated.

7. The weighting oil of claim 6 wherein the fatty acid is selected from the group consisting of oleic acid, linoleic acid, and mixtures thereof.

8. The weighting oil of claim 5 wherein the brominated sucrose fatty acid polyester is selected from the group consisting of hexaoleate, heptaoleate, and octaoleate of sucrose, and mixtures thereof.

9. A composition comprising the weighting oil of claim 1 and one or more flavors.

10. The compositon of claim 12 in the form of an emulsion having particles of from about 0.1 to about 3.0 microns in diameter.

11. The composition of claim 9 wherein the flavor is selected from the group consisting of fruit, cola, tea, coffee, meat, vegetable, or chocolate flavors.

12. The composition of claim 9 further comprising an emulsifying agent.

13. The composition of claim 12 wherein the emulsifying agent is gum acacia.

* * * * *